US012272860B2

(12) United States Patent
Chen et al.

(10) Patent No.: US 12,272,860 B2
(45) Date of Patent: Apr. 8, 2025

(54) ANTENNA DEVICE BASED ON TRANSPARENT SUBSTRATE AND METHOD OF CONFIGURING ANTENNA DEVICE

(71) Applicant: Industrial Technology Research Institute, Hsinchu (TW)

(72) Inventors: Wei-Chung Chen, Kaohsiung (TW); Liyang Tsai, Mlan County (TW); Kuang-Hui Shih, Tainan (TW); Ruo-Lan Chang, New Taipei (TW); Mei-Ju Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 18/090,507

(22) Filed: Dec. 29, 2022

(65) Prior Publication Data

US 2024/0222844 A1 Jul. 4, 2024

(51) Int. Cl.

*H01Q 1/12* (2006.01)
*H01Q 1/38* (2006.01)
*H01Q 1/48* (2006.01)
*H01Q 13/10* (2006.01)

(52) U.S. Cl.

CPC ............. *H01Q 1/1285* (2013.01); *H01Q 1/38* (2013.01); *H01Q 1/48* (2013.01); *H01Q 13/106* (2013.01)

(58) Field of Classification Search

CPC .......... H01Q 1/38; H01Q 1/422; H01Q 13/10; H01Q 13/106

See application file for complete search history.

(56) References Cited

U.S. PATENT DOCUMENTS

| | | | | |
|---|---|---|---|---|
| 10,381,750 B2* | 8/2019 | Jung | ........................ | H01Q 1/44 |
| 2009/0278744 A1* | 11/2009 | Kirino | ..................... | H01P 1/184 343/700 MS |
| 2014/0106684 A1* | 4/2014 | Burns | .................... | H01Q 21/28 29/601 |
| 2019/0341693 A1* | 11/2019 | Haziza | .................... | H01P 11/00 |

(Continued)

FOREIGN PATENT DOCUMENTS

| | | |
|---|---|---|
| CN | 111033893 | 4/2020 |
| EP | 2526589 | 11/2014 |

(Continued)

OTHER PUBLICATIONS

"Office Action of Taiwan Counterpart Application", issued on Nov. 8, 2023, p. 1-p. 5.

*Primary Examiner* — Jason M Crawford
(74) *Attorney, Agent, or Firm* — JCIPRNET

(57) ABSTRACT

An antenna device based on a transparent substrate and a method of configuring an antenna device are provided. The antenna device includes a transparent substrate, a first dielectric layer, and an antenna. The transparent substrate includes a first surface and a second surface opposite to the first surface. The first dielectric layer includes a third surface and a fourth surface opposite to the third surface, wherein the first dielectric layer is in contact with the first surface via the third surface to be disposed on the transparent substrate, wherein a permittivity of the first dielectric layer is less than a permittivity of the transparent substrate. The antenna includes a radiation part, wherein the radiation part is disposed on one of the second surface and the fourth surface.

19 Claims, 9 Drawing Sheets

(56) References Cited

U.S. PATENT DOCUMENTS

| | | | | |
|---|---|---|---|---|
| 2020/0227819 | A1* | 7/2020 | Oh | H04M 1/0266 |
| 2020/0411993 | A1* | 12/2020 | Jia | H01Q 9/0414 |
| 2021/0175609 | A1* | 6/2021 | Ryoo | H01Q 9/42 |
| 2021/0328328 | A1* | 10/2021 | Sung | H01Q 1/44 |
| 2022/0131256 | A1* | 4/2022 | Lee | H01Q 1/243 |
| 2022/0328955 | A1* | 10/2022 | Park | H01Q 1/38 |
| 2023/0032455 | A1* | 2/2023 | Shin | H01Q 1/2266 |
| 2023/0037915 | A1* | 2/2023 | Chen | H01Q 1/2283 |
| 2024/0170854 | A1* | 5/2024 | Jin | H01Q 1/38 |
| 2024/0222844 | A1* | 7/2024 | Chen | H01Q 1/48 |

FOREIGN PATENT DOCUMENTS

| | | |
|---|---|---|
| KR | 101060424 | 8/2011 |
| TW | M514051 | 12/2015 |
| TW | M530436 | 10/2016 |
| TW | 202200809 | 1/2022 |
| TW | 202213298 | 4/2022 |
| TW | 202215390 | 4/2022 |

* cited by examiner

ANTENNA DEVICE BASED ON TRANSPARENT SUBSTRATE AND METHOD OF CONFIGURING ANTENNA DEVICE

TECHNICAL FIELD

The disclosure relates to an antenna device and a method of configuring an antenna device, and more particularly to an antenna device based on a transparent substrate and a method of configuring an antenna device.

BACKGROUND

In 5G communication, wireless signals may be transmitted based on beam-forming techniques to achieve the effect of reducing signal-to-noise ratio. However, wireless signals in 5G communication have worse diffraction characteristics, and the wireless signals are attenuated quickly. Therefore, the wireless signals are readily affected by obstacles such as buildings, plants, moisture, or oxygen, and thus are significantly attenuated. Accordingly, how to propose an antenna device that may effectively reduce the attenuation of wireless signals is one of the objects those skilled in the art are working towards.

SUMMARY

The disclosure provides an antenna device based on a transparent substrate and a method of configuring an antenna device that may improve the gain and light transmittance of the antenna device.

An antenna device based on a transparent substrate of the disclosure includes a transparent substrate, a first dielectric layer, and an antenna. The transparent substrate includes a first surface and a second surface opposite to the first surface. The first dielectric layer includes a third surface and a fourth surface opposite to the third surface, wherein the first dielectric layer is in contact with the first surface via the third surface to be disposed on the transparent substrate, wherein a permittivity of the first dielectric layer is less than a permittivity of the transparent substrate. The antenna includes a radiation part, wherein the radiation part is disposed on one of the second surface and the fourth surface.

A method of configuring an antenna device based on a transparent substrate of the disclosure, wherein the antenna device includes a transparent substrate having a first surface and a second surface opposite to the first surface, a first dielectric layer having a third surface and a fourth surface opposite to the third surface, and an antenna having a radiation part, wherein the method includes: bringing the third surface of the first dielectric layer in contact with the first surface of the transparent substrate to dispose the first dielectric layer on the transparent substrate, wherein a permittivity of the first dielectric layer is less than a permittivity of the transparent substrate; and disposing the radiation part of the antenna on one of the second surface of the transparent substrate and the fourth surface of the first dielectric layer.

Based on the above, an embodiment of the disclosure has a transparent antenna structure to increase the transmission gain of wireless signals.

DETAILED DESCRIPTION OF DISCLOSED EMBODIMENTS

Figure 1:
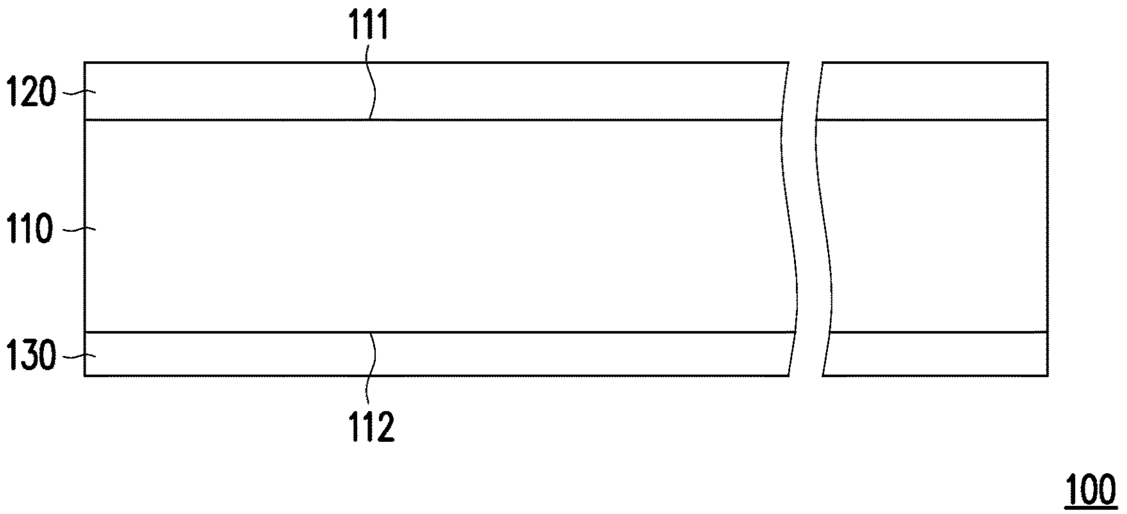
FIG. 1 shows a cross-sectional view of an antenna device 100 based on a transparent substrate.

To make the contents of the disclosure more easily understood, embodiments are provided below as examples of the plausibility of implementation of the disclosure. Moreover, when applicable, devices/members/steps having the same reference numerals in figures and embodiments represent the same or similar parts.

FIG. 1 shows a cross-sectional view of an antenna device 100 based on a transparent substrate. The antenna device 100 may include a transparent substrate 110, an antenna 120, and a ground layer 130. The antenna 120 may be disposed on a surface 111 of the transparent substrate 110, and the ground layer 130 may be disposed at a surface 112 of the transparent substrate 110, wherein the surface 112 may be an opposite surface of the surface 111. The transparent substrate 110 of the antenna device 100 may make it easier for a wireless signal and/or light to penetrate indoors. However, the gain effect of the structure of the antenna device 100 on the wireless signal may be further improved.

Figure 2:
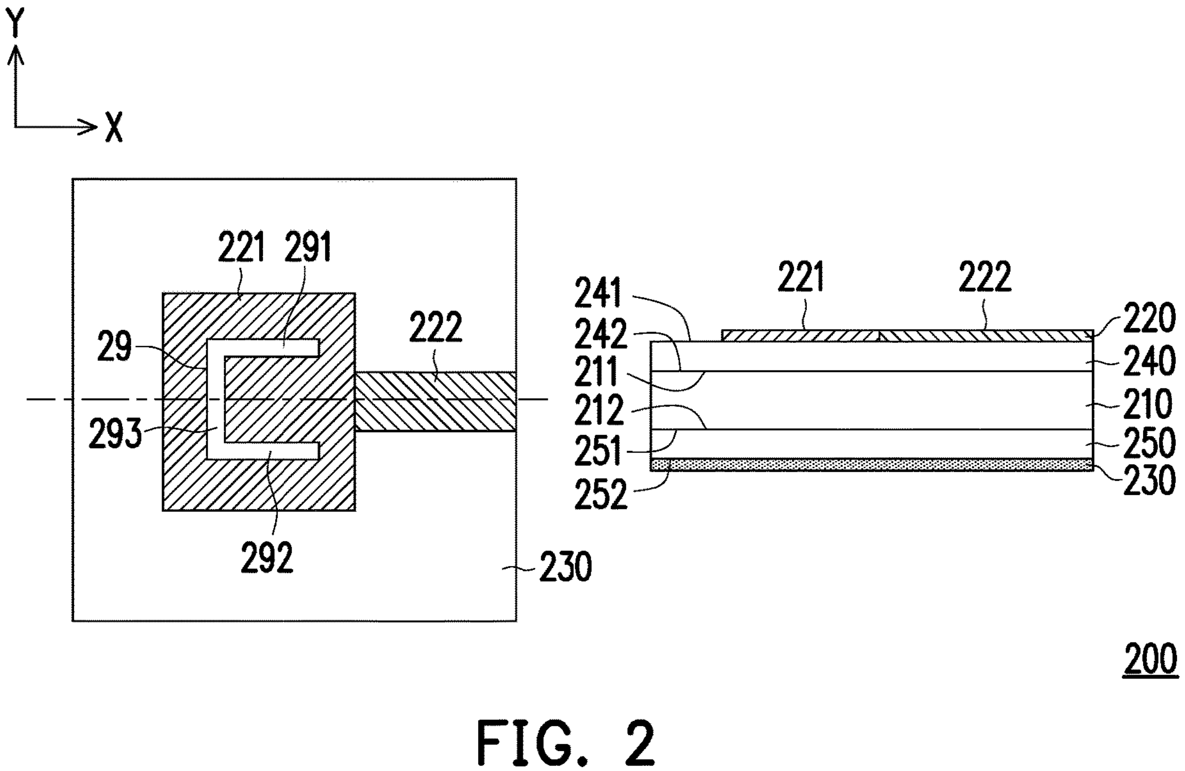
FIG. 2 shows a top view and a cross-sectional view of an antenna device 200 according to an embodiment of the disclosure.

FIG. 2 shows a top view and a cross-sectional view of an antenna device 200 according to an embodiment of the disclosure. The antenna device 200 may include a transparent substrate 210, an antenna 220, and a ground layer 230. In an embodiment, the antenna device 200 may further include a dielectric layer 240 and/or a dielectric layer 250.

The transparent substrate 210 may include a surface 211 and a surface 212 opposite to the surface 211. The material of the transparent substrate 210 may include a product related to silicon dioxide ($SiO_2$) such as soda lime glass, lead glass, borosilicate glass, or quartz glass, or may include a flexible plastic product resistant to high temperature and acid and alkali such as polyimide (PI) film, polyethylene naphthalate (PEN) film, or polyester (PET) film.

The dielectric layer 240 may include a surface 241 and a surface 242 opposite to the surface 241. The dielectric layer 240 may be in contact with the surface 211 via the surface 242 to be disposed at a side of the transparent substrate 210. The permittivity of the dielectric layer 240 may be less than the permittivity of the transparent substrate 210. The permittivity of the transparent substrate 210 is, for example, 5.6. In an embodiment, the permittivity of the dielectric layer 240 may be greater than or equal to 2 and less than or equal to 4. The material of the dielectric layer 240 may include thermal type or UV type polyimide (PI), colorless PI (CPI), photosensitive PI (PSPI), polybenzoxazole (PBO), liquid-crystal polymer (LCP), or other suitable materials.

The dielectric layer 250 may include a surface 251 and a surface 252 opposite to the surface 251. The dielectric layer 250 may be in contact with the surface 212 via the surface 251 to be disposed at a side of the transparent substrate 210. The permittivity of the dielectric layer 250 may be less than the permittivity of the transparent substrate 210. In an embodiment, the permittivity of the dielectric layer 250 may be greater than or equal to 2 and less than or equal to 4. The material of the dielectric layer 250 may be similar to that of the dielectric layer 240, for example, may include thermal type or UV curing type PI, CPI, PSPI, PBO, LCP, or other suitable materials.

The antenna 220 is, for example, a printed circuit that may be configured to radiate a wireless signal or receive a wireless signal, or a patterned circuit produced via a semiconductor process (e.g., lithography process). The antenna 220 may include a radiation part 221 and a feeding part 222. In an embodiment, the antenna 220 may further include a ground layer 230. The antenna 220 may be disposed on the surface 241 of the dielectric layer 240. If the antenna device 200 does not include the dielectric layer 240, the antenna 220 may be disposed on the surface 211 of the transparent substrate 210. The material of the antenna 220 may include indium tin oxide (ITO), indium-doped zinc oxide (IZO), copper, silver, conductive polymer, carbon nanotube, graphene, metal nanowire, or other suitable conductive materials.

In an embodiment, the radiation part 221 and the feeding part 222 may be disposed on the surface 241 of the dielectric layer 240. The feeding part 222 and the radiation part 221 may be in direct contact and electrically connected. The feeding part 222 is configured to receive an electrical signal and transmit the electrical signal to the radiation part 221. The shape of the radiation part 221 may be any shape such as rectangle, circle, or triangle. The radiation part 221 may optionally include a slot of any shape according to requirements. For example, the radiation part 221 may be a rectangular structure including a slot 29 (not shown in the cross-sectional view of FIG. 2). The slot 29 may, for example, include a part 291 and a part 292 extended along the X direction, and may include a part 293 extended along the Y direction. The part 293 may be substantially perpendicular to the part 291 and the part 292. An end point of the part 291 may be connected to an end point of the part 292 via the part 293. The long sides of the rectangular structure may be extended along the Y direction, and the short sides of the rectangular structure may be extended along the X direction.

The ground layer 230 may be disposed on the surface 252 of the dielectric layer 250 or in contact with the transparent substrate 210. The material of the ground layer 230 may include ITO, IZO, copper, silver, conductive polymer, carbon nanotube, graphene, metal nanowire, or other suitable conductive materials. The ground layer 230 may be used as a reflection layer of the radiation part 221 and may assist the signal transmission of the feeding part 222.

Figure 3:
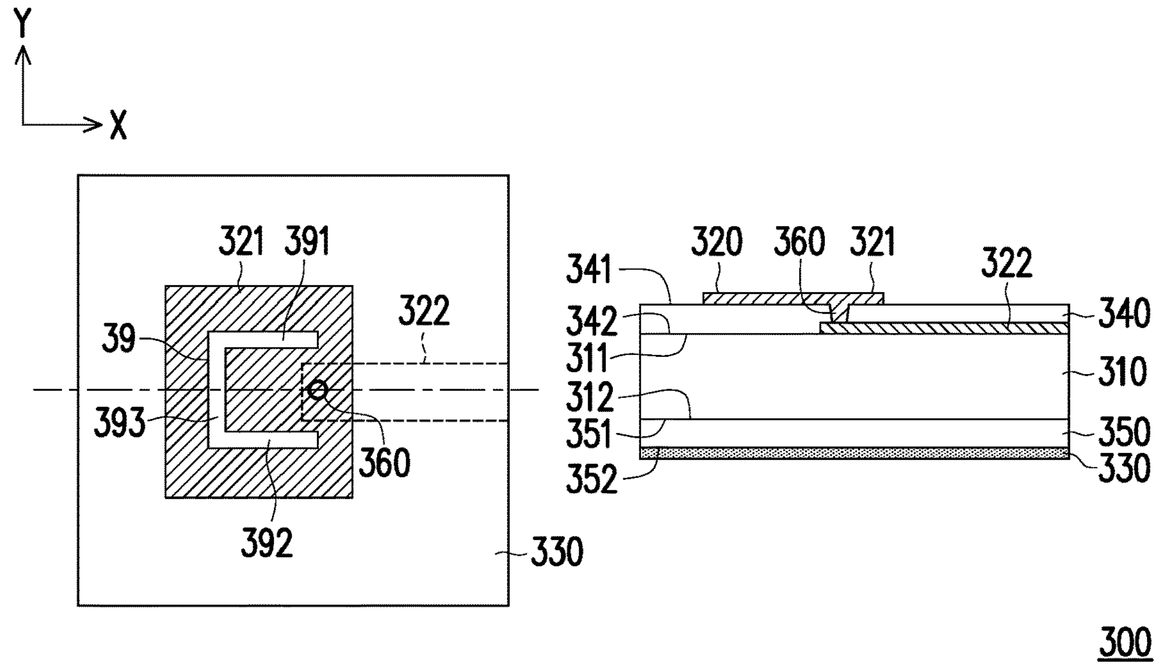
FIG. 3 shows a top view and a cross-sectional view of an antenna device 300 according to an embodiment of the disclosure.

FIG. 3 shows a top view and a cross-sectional view of an antenna device 300 according to an embodiment of the disclosure. The antenna device 300 may include a transparent substrate 310, an antenna 320, and a ground layer 330. In an embodiment, the antenna device 300 may further include a dielectric layer 340 and/or a dielectric layer 350. The antenna device 300 may be similar to the antenna device 200.

The transparent substrate 310 may include a surface 311 and a surface 312 opposite to the surface 311. The dielectric layer 340 may include a surface 341 and a surface 342 opposite to the surface 341. The dielectric layer 340 may be in contact with the surface 311 via the surface 342 to be disposed at a side of the transparent substrate 310. The dielectric layer 350 may include a surface 351 and a surface 352 opposite to the surface 351. The dielectric layer 350 may be in contact with the surface 312 via the surface 351 to be disposed at a side of the transparent substrate 310. The permittivity of the dielectric layer 340 or 350 may be less than the permittivity of the transparent substrate 310. In an embodiment, the permittivity of the dielectric layer 340 or 350 may be greater than or equal to 2 and less than or equal to 4. The material of the dielectric layer 340 or 350 may include thermal type or UV curing type PI, CPI, PSPI, PBO, LCP, or other suitable materials.

The antenna 320 is, for example, a printed circuit that may be configured to radiate a wireless signal or receive a wireless signal, or a patterned circuit produced via a semiconductor process (e.g., lithography process). The antenna 320 may include a radiation part 321 and a feeding part 322. In an embodiment, the antenna 320 may further include a ground layer 330. The radiation part 321 may be disposed on the surface 341 of the dielectric layer 340. The feeding part 322 may be disposed in the dielectric layer 340 and in contact with the surface 311 of the transparent substrate 310. The material of the antenna 320 may include ITO, IZO, copper, silver, conductive polymer, carbon nanotube, graphene, metal nanowire, or other suitable conductive materials.

The feeding part 322 may be electrically connected to the radiation part 321 through a via 360. The feeding part 322 is configured to receive an electrical signal and transmit the electrical signal to the radiation part 321. The shape of the radiation part 321 may be any shape such as rectangle, circle, or triangle. The radiation part 321 may further include a slot of any shape according to requirements. For example, the radiation part 321 may be a rectangular structure including a slot 39 (not shown in the cross-sectional view of FIG. 3). The slot 39 may, for example, include a part 391 and a part 392 extended along the X direction, and may include a part 393 extended along the Y direction. The part 393 may be substantially perpendicular to the part 391 and the part 392. An end point of the part 391 may be connected to an end point of the part 392 via the part 393. The long sides of the rectangular structure may be extended along the Y direction, and the short sides of the rectangular structure may be extended along the X direction. A part of the feeding part 322 may generate a projection on the radiation part 321, wherein the projection may be not overlapped with the slot 39.

The ground layer 330 may be disposed on the surface 352 of the dielectric layer 350. The material of the ground layer 330 may include ITO, IZO, copper, silver, conductive polymer, carbon nanotube, graphene, metal nanowire, or other suitable conductive materials. The ground layer 330 may be used as a reflection layer of the radiation part 321 and may assist the signal transmission of the feeding part 322.

The antenna device (for example: an antenna device 200, 300, 500, 600, 700, 800, 900, 1000, or 1100) may further include a via, wherein the opening of the via may be electrically connected to any medium in the antenna device (for example: transparent substrate, dielectric layer, antenna radiation part, antenna feeding part, or ground layer), or may be disposed on any surface of any medium. The via is, for example, through glass via (TGV).

Figure 4:
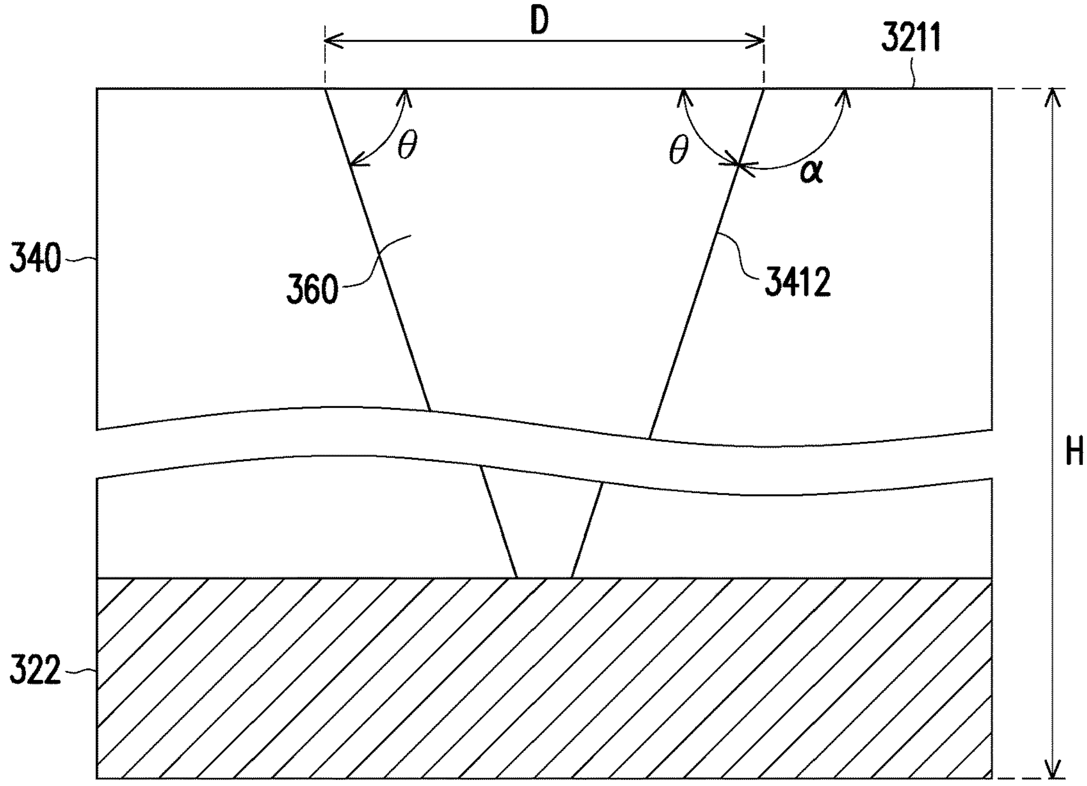
FIG. 4 shows a cross-sectional view of a via 360 according to an embodiment of the disclosure.

Taking the via 360 as an example, FIG. 4 shows a cross-sectional view of the via 360 according to an embodiment of the disclosure. An opening located at one end of the via 360 is disposed on a surface 3211 of the radiation part 321, and the radiation part 321 may be electrically connected to the feeding part 322 via the opening at another end of the via 360. A via diameter D of the via 360 may be less than or equal to 0.5 mm. In an embodiment, the ratio (i.e.: aspect ratio) of the via diameter D to a length H of the via 360 is greater than or equal to 0.5 and less than or equal to 5. The via 360 may form a sidewall 3412 of the dielectric layer 340. A taper angle θ of the via 360 may be greater than or equal to 40 degrees and less than or equal to 85 degrees, wherein the taper angle θ is a supplementary angle to an angle α between the surface 3211 and the sidewall 3412 of the radiation part 321.

A bonding pad (not shown) may be disposed at the opening surface of the via 360. The material of the bonding pad may include a metal with good electrical conductivity. The bonding pad may be configured to be electrically connected to an external electronic device. For example, the bonding pad may be configured to electrically couple the antenna device with a communication chip. The communication chip may transmit a signal to the antenna device via the bonding pad to operate the antenna device.

Figure 5:
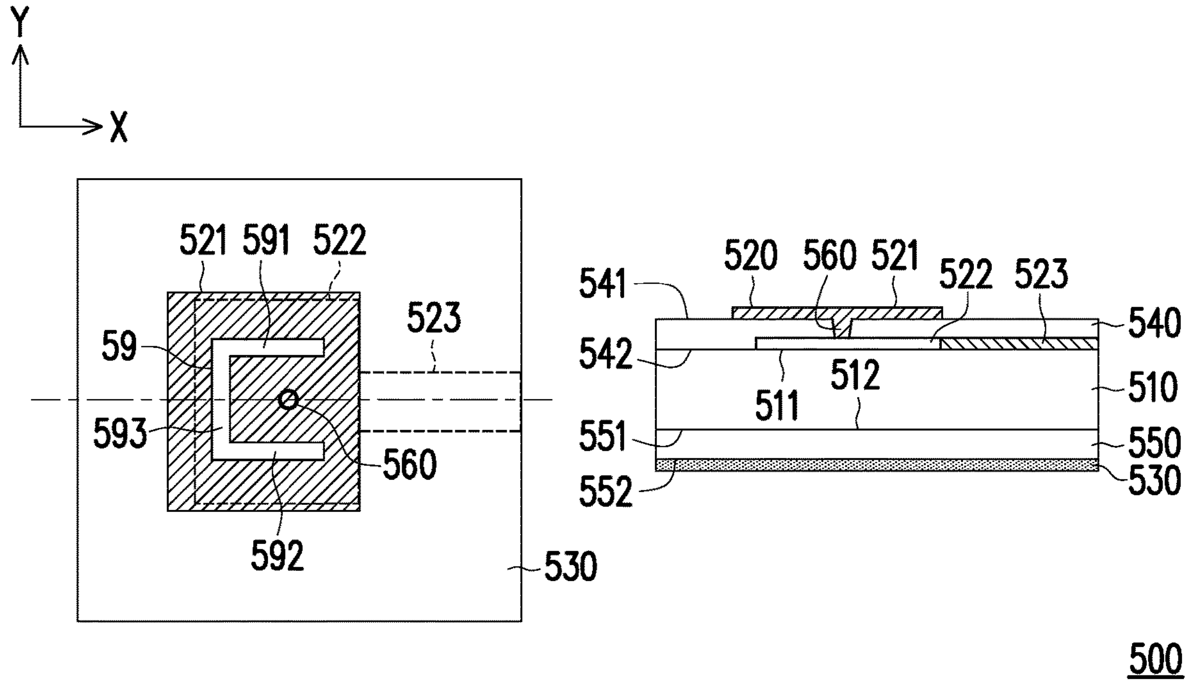
FIG. 5 shows a top view and a cross-sectional view of an antenna device 500 according to an embodiment of the disclosure.

FIG. 5 shows a top view and a cross-sectional view of the antenna device 500 according to an embodiment of the disclosure. The antenna device 500 may include a transparent substrate 510, an antenna 520, and a ground layer 530. In an embodiment, the antenna device 500 may further include a dielectric layer 540 or a dielectric layer 550. The antenna device 500 may be similar to the antenna device 300.

The transparent substrate 510 may include a surface 511 and a surface 512 opposite to the surface 511. The dielectric layer 540 may include a surface 541 and a surface 542 opposite to the surface 541. The dielectric layer 540 may be in contact with the surface 511 via the surface 542 to be disposed at a side of the transparent substrate 510. The dielectric layer 550 may include a surface 551 and a surface 552 opposite to the surface 551. The dielectric layer 550 may be in contact with the surface 512 via the surface 551 to be disposed on the transparent substrate 510. The permittivity of the dielectric layer 540 or 550 may be less than the permittivity of the transparent substrate 510.

The antenna 520 is, for example, a printed circuit that may be configured to radiate a wireless signal or receive a wireless signal, or a patterned circuit produced via a semiconductor process (e.g., lithography process). The antenna 520 may include a radiation part and a feeding part 523, wherein the radiation part may include a radiation unit 521 and a radiation unit 522. In an embodiment, the antenna 520 may further include a ground layer 530. The area of the radiation unit 521 and the area of the radiation unit 522 may be the same or different. The radiation unit 521 may be disposed on the surface 541 of the dielectric layer 540. The radiation unit 522 may be disposed in the dielectric layer 540 and in contact with the surface 511 of the transparent substrate 510. The feeding part 523 may be disposed in the dielectric layer 540 and in contact with the surface 511 of the transparent substrate 510.

The radiation unit 521 may be electrically connected to the radiation unit 522 through a via 560. The feeding part 523 and the radiation unit 522 are in direct contact and electrically connected. The feeding part 523 is configured to receive an electrical signal and transmit the electrical signal to the radiation unit 522. The shape of the radiation unit 521 (or the radiation unit 522) may be any shape such as rectangle, circle, or triangle. The radiation unit 521 may further include a slot of any shape. For example, the radiation part 521 may be a rectangular structure including a slot 59 (not shown in the cross-sectional view of FIG. 5). The slot 59 may, for example, include a part 591 and a part 592 extended along the X direction, and may include a part 593 extended along the Y direction. The part 593 may be substantially perpendicular to the part 591 and the part 592. An end point of the part 591 may be connected to an end point of the part 592 via the part 593. The long sides of the rectangular structure may be extended along the Y direction, and the short sides of the rectangular structure may be extended along the X direction.

The ground layer 530 may be disposed on the surface 552 of the dielectric layer 550. The ground layer 530 may be used as a reflection layer for the radiation unit 521 and the radiation unit 522, and may assist the signal transmission of the feeding part 523.

An opening located at an end of the via 560 may be connected to the radiation unit 521, and an opening located at another end of the via 560 may be connected to the radiation unit 522. The via diameter of the via 560 may be less than or equal to 5 microns. The ratio (i.e.: aspect ratio) of the via diameter to the length of the via 560 is greater than or equal to 0.5 and less than or equal to 5. The taper angle of the via 560 may be greater than or equal to 40 degrees and less than or equal to 85 degrees.

Figure 6:
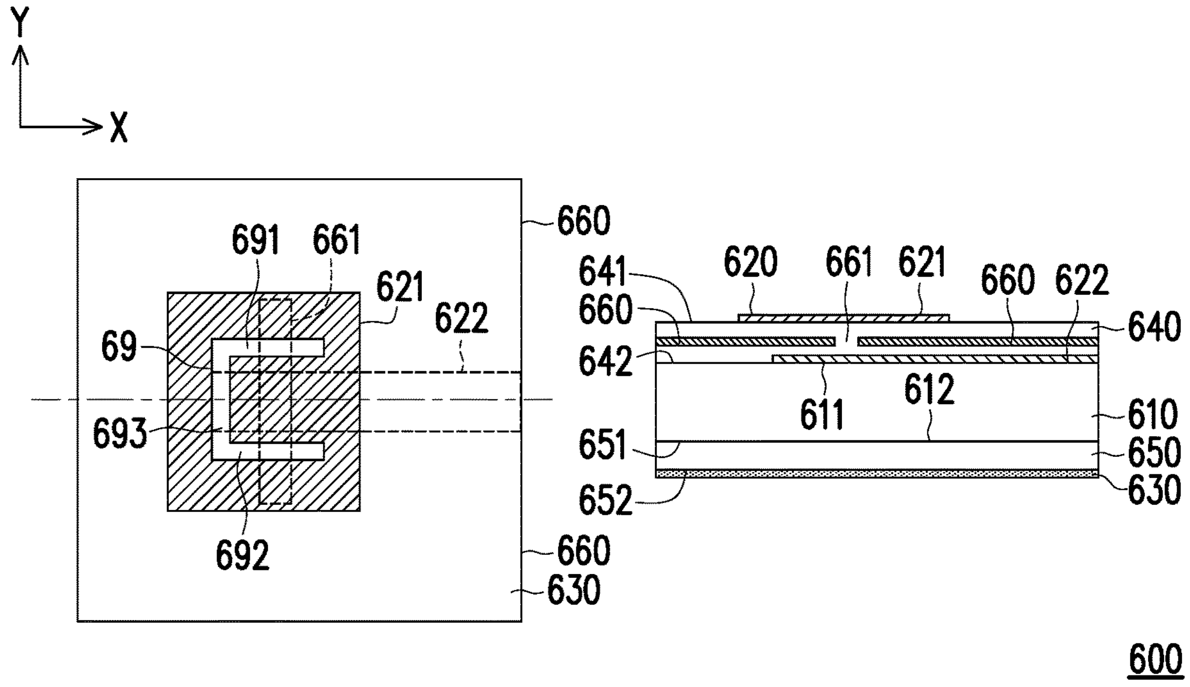
FIG. 6 shows a top view and a cross-sectional view of an antenna device 600 according to an embodiment of the disclosure.

FIG. 6 shows a top view and a cross-sectional view of the antenna device 600 according to an embodiment of the disclosure. The antenna device 600 may include a transparent substrate 610, an antenna 620, a ground layer 630, a dielectric layer 640, and a ground layer 660. In an embodiment, the antenna device 600 may further include a dielectric layer 650.

The transparent substrate 610 may include a surface 611 and a surface 612 opposite to the surface 611. The dielectric layer 640 may include a surface 641 and a surface 642 opposite to the surface 641. The dielectric layer 640 may be in contact with the surface 611 via the surface 642 to be disposed at a side of the transparent substrate 610. The dielectric layer 650 may include a surface 651 and a surface 652 opposite to the surface 651. The dielectric layer 650 may be in contact with the surface 612 via the surface 651 to be disposed at a side of the transparent substrate 610. The permittivity of the dielectric layer 640 or 650 may be less than the permittivity of the transparent substrate 610.

The ground layer 630 may be disposed on the surface 652 of the dielectric layer 650. The ground layer 630 may be used as a reflection layer of the radiation part 621 and may assist the signal transmission of the feeding part 622.

The antenna 620 is, for example, a printed circuit that may be configured to radiate a wireless signal or receive a wireless signal, or a patterned circuit produced via a semiconductor process (e.g., lithography process). The antenna 620 may include a radiation part 621 and a feeding part 622. In an embodiment, the antenna 620 may further include a ground layer 630. The radiation part 621 may be disposed on the surface 641 of the dielectric layer 640. The feeding part 622 may be disposed in the dielectric layer 640 and in contact with the surface 611 of the transparent substrate 610.

The radiation part 621 may be vertically capacitively coupled with the feeding part 622. The feeding part 622 is configured to receive an electric signal and transmit the electric signal to the radiation part 621. The shape of the radiation part 621 may be any shape such as rectangle, circle, or triangle. The radiation part 621 may further include a slot of any shape. For example, the radiation part 621 may be a rectangular structure including a slot 69 (not shown in the cross-sectional view of FIG. 6). The slot 69 may, for example, include a part 691 and a part 692 extended along the X direction, and may include a part 693 extended along the Y direction. The part 693 may be substantially perpendicular to the part 691 and the part 692. An end point of the part 691 may be connected to an end point of the part 692 via the part 693. The long sides of the rectangular structure may be extended along the Y direction, and the short sides of the rectangular structure may be extended along the X direction.

The ground layer 660 is included in the dielectric layer 640. The ground layer 660 may, for example, include a slot 661 and may be disposed between the radiation part 621 and the feeding part 622. The projection of the slot 661 and the projection of a part of the radiation part 621 need to be overlapped on the feeding part 622. Accordingly, the radiation part 621 and the feeding part 622 may be vertically capacitively coupled to each other via the slot 661. The projection of a part of the slot 69 may be located on the feeding part 622.

Figure 7:
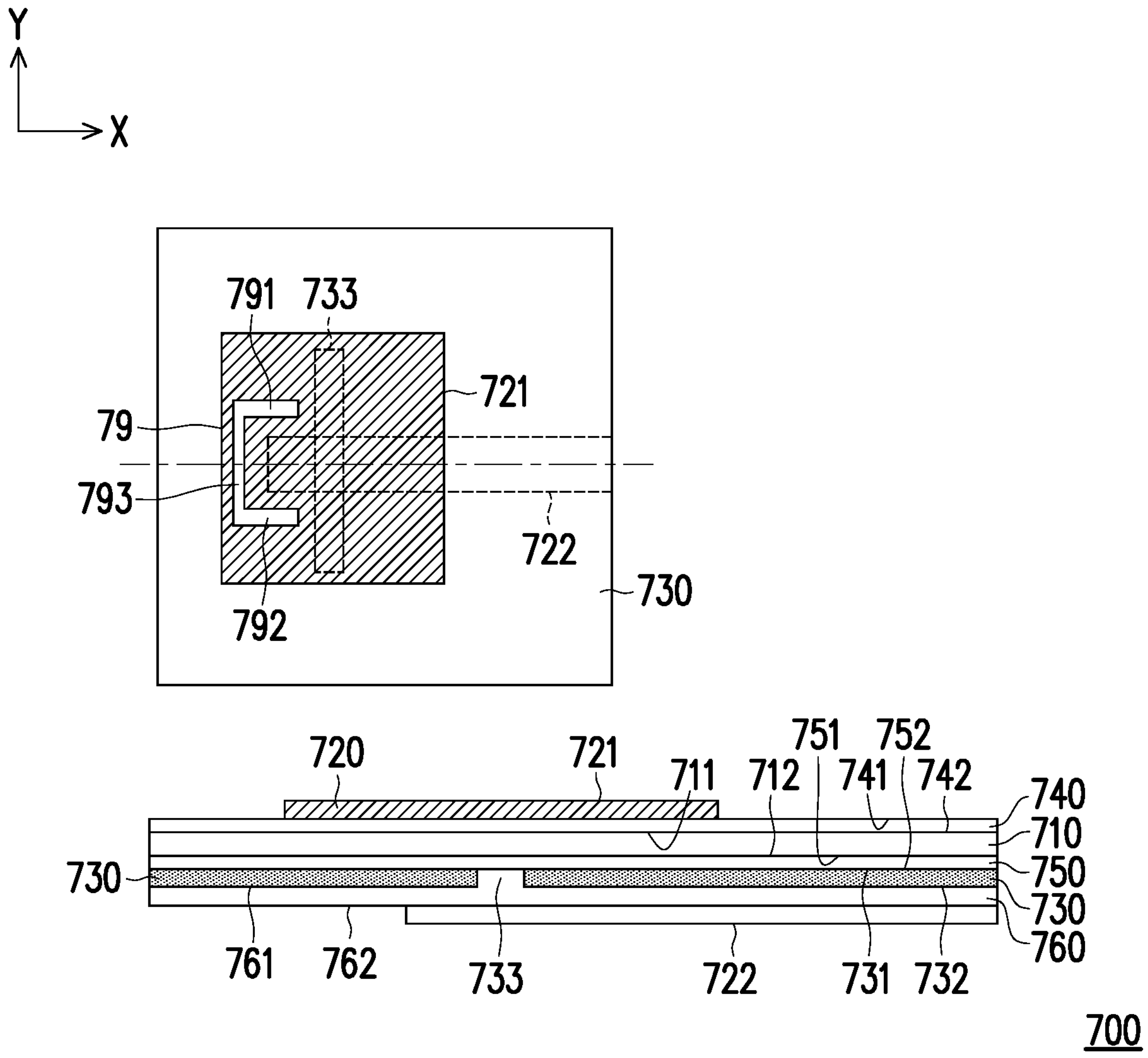
FIG. 7 shows a top view and a cross-sectional view of an antenna device 700 according to an embodiment of the disclosure.

FIG. 7 shows a top view and a cross-sectional view of the antenna device 700 according to an embodiment of the disclosure. The antenna device 700 may include a transparent substrate 710, an antenna 720, a ground layer 730, and a dielectric layer 760. In an embodiment, the antenna device 700 may further include a dielectric layer 740 and/or a dielectric layer 750. The antenna device 700 may be similar to the antenna device 600.

The transparent substrate 710 may include a surface 711 and a surface 712 opposite to the surface 711. The dielectric layer 740 may include a surface 741 and a surface 742 opposite to the surface 741. The dielectric layer 740 may be in contact with the surface 711 via the surface 742 to be disposed at a side of the transparent substrate 710. The dielectric layer 750 may include a surface 751 and a surface 752 opposite to the surface 751. The dielectric layer 750 may be in contact with the surface 712 via the surface 751 to be disposed at a side of the transparent substrate 710. The dielectric layer 760 may include a surface 761 and a surface 762 opposite to the surface 761. The permittivity of the dielectric layer 740, 750, or 760 may be less than the permittivity of the transparent substrate 710.

The ground layer 730 may include a surface 731 and a surface 732 opposite to the surface 731. The ground layer 730 may be in contact with the surface 752 of the dielectric layer 750 via the surface 731 to be disposed at a side of the dielectric layer 750. The dielectric layer 760 may be in contact with the surface 732 of the ground layer 730 via the surface 761 to be disposed at a side of the ground layer 730. The ground layer 730 may be used as a reflection layer of the radiation part 721 and may assist the signal transmission of the feeding part 722.

The antenna 720 is, for example, a printed circuit that may be configured to radiate a wireless signal or receive a wireless signal, or a patterned circuit produced via a semiconductor process (e.g., lithography process). The antenna 720 may include a radiation part 721 and a feeding part 722. In an embodiment, the antenna 720 may further include a ground layer 730. The radiation part 721 may be disposed on the surface 741 of the dielectric layer 740. The feeding part 722 may be disposed on the surface 762 of the dielectric layer 760.

The radiation part 721 may be vertically capacitively coupled with the feeding part 722. The feeding part 722 is configured to receive an electric signal and transmit the electric signal to the radiation part 721. The shape of the radiation part 721 may be any shape such as rectangle, circle, or triangle. The radiation part 721 may further include a slot of any shape. For example, the radiation part 721 may be a rectangular structure including a slot 79 (not shown in the cross-sectional view of FIG. 7). The slot 79 may, for example, include a part 791 and a part 792 extended along the X direction, and may include a part 793 extended along the Y direction. The part 793 may be substantially perpendicular to the part 791 and the part 792. An end point of the part 791 may be connected to an end point of the part 792 via the part 793. The long sides of the rectangular structure may be extended along the Y direction, and the short sides of the rectangular structure may be extended along the X direction.

The ground layer 730 may include a slot 733 and may be disposed between the dielectric layer 750 and the dielectric layer 760. The projection of the slot 733 and the projection of a part of the radiation part 721 need to be overlapped on the feeding part 722. Accordingly, the radiation part 721 and the feeding part 722 may be vertically capacitively coupled to each other via the slot 733. The projection of the feeding part 722 on the radiation part 721 may be not overlapped with the slot 79.

Figure 8:
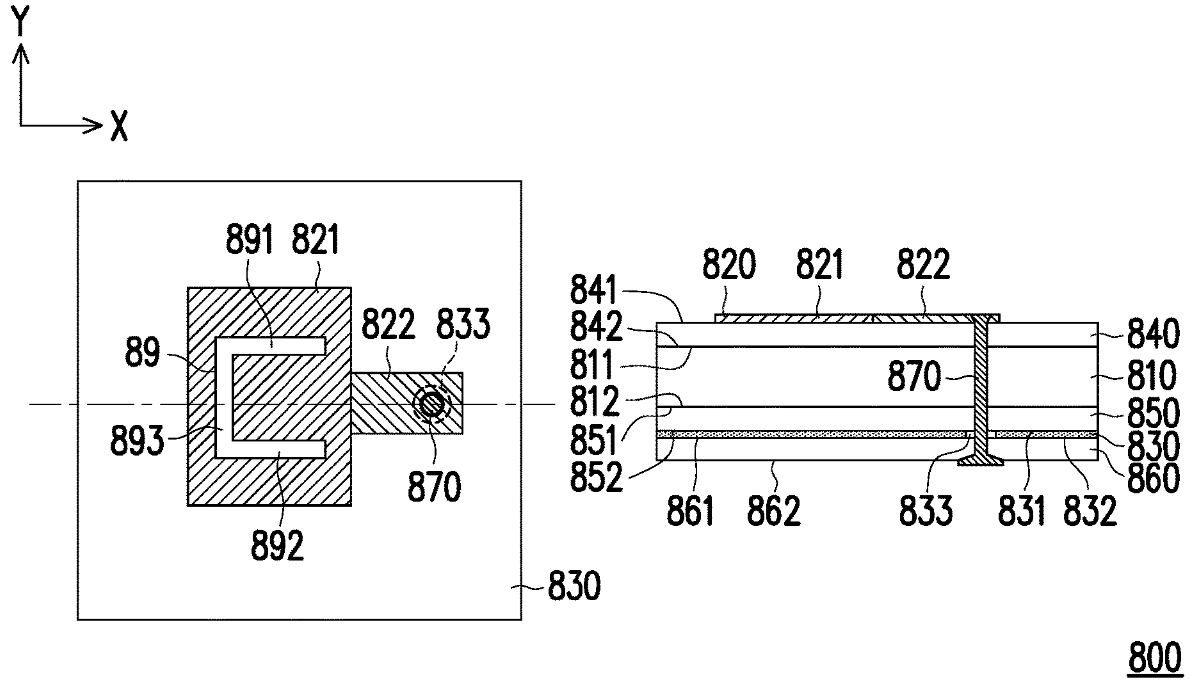
FIG. 8 shows a top view and a cross-sectional view of an antenna device 800 according to an embodiment of the disclosure.

FIG. 8 shows a top view and a cross-sectional view of the antenna device 800 according to an embodiment of the disclosure. The antenna device 800 may include a transparent substrate 810, an antenna 820, a ground layer 830, and a dielectric layer 860. In an embodiment, the antenna device 800 may further include a dielectric layer 840 and/or a dielectric layer 850.

The transparent substrate 810 may include a surface 811 and a surface 812 opposite to the surface 811. The dielectric layer 840 may include a surface 841 and a surface 842 opposite to the surface 841. The dielectric layer 840 may be in contact with the surface 811 via the surface 842 to be disposed at a side of the transparent substrate 810. The dielectric layer 850 may include a surface 851 and a surface 852 opposite to the surface 851. The dielectric layer 860 may include a surface 861 and a surface 862 opposite to the surface 861. The permittivity of the dielectric layer 840, 850, or 860 may be less than the permittivity of the transparent substrate 810.

The antenna 820 is, for example, a printed circuit that may be configured to radiate a wireless signal or receive a wireless signal, or a patterned circuit produced via a semiconductor process (e.g., lithography process). The antenna 820 may include a radiation part 821 and a feeding part 822. In an embodiment, the antenna 820 may further include a ground layer 830. The antenna 820 may be disposed on the surface 841 of the dielectric layer 840. If the antenna device 800 does not include the dielectric layer 840, the antenna 820 may also be directly disposed on the surface 811 of the transparent substrate 810.

The radiation part 821 and the feeding part 822 may be disposed on the surface 841 of the dielectric layer 840. The feeding part 822 and the radiation part 821 are in direct contact and electrically connected. The feeding part 822 is configured to receive an electrical signal and transmit the electrical signal to the radiation part 821. The shape of the radiation part 821 may be any shape such as rectangle, circle, or triangle. The radiation part 821 may optionally include a slot of any shape. For example, the radiation part 821 may be a rectangular structure including a slot 89 (not shown in the cross-sectional view of FIG. 8). The slot 89 may, for example, include a part 891 and a part 892 extended along the X direction, and may include a part 893 extended along the Y direction. The part 893 may be substantially perpendicular to the part 891 and the part 892. An end point of the part 891 may be connected to an end point of the part 892 via the part 893. The long sides of the rectangular structure may be extended along the Y direction, and the short sides of the rectangular structure may be extended along the X direction.

The ground layer 830 may include a surface 831 and a surface 832 opposite to the surface 831. The ground layer 830 may be in contact with the surface 852 of the dielectric layer 850 via the surface 831 to be disposed at a side of the dielectric layer 850. The dielectric layer 860 may be in contact with the surface 832 of the ground layer 830 via the surface 861 to be disposed at a side of the ground layer 830. The ground layer 830 may be used as a reflection layer of the radiation part 821 and may assist the signal transmission of the feeding part 822.

The ground layer 830 may include a slot 833 and may be disposed between the dielectric layer 850 and the dielectric layer 860. The feeding part 822 is not in contact with the ground layer 830, and the via 870 may be extended from the feeding part 822 to the dielectric layer 860 via the slot 833.

The opening at one end of the via 870 may be connected to the feeding part 822, and the opening located at another end of the via 870 may be disposed on the surface 862 of the dielectric layer 860. A bonding pad (not shown) may be disposed at the opening surface of the via 870. The via diameter of the via 870 may be, for example, less than or equal to 5 microns. The ratio (i.e.: aspect ratio) of the via diameter to the length of the via 870 is greater than or equal to 0.5 and less than or equal to 5. The taper angle of the via 870 may be greater than or equal to 40 degrees and less than or equal to 85 degrees.

Figure 9:
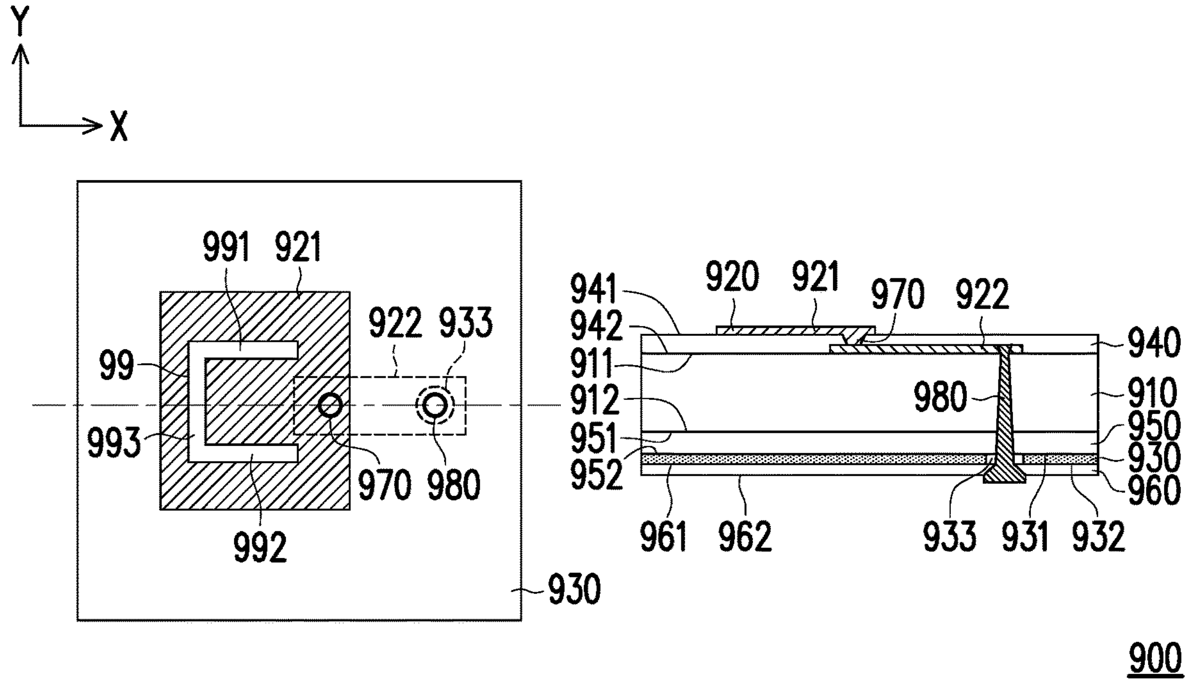
FIG. 9 shows a top view and a cross-sectional view of an antenna device 900 according to an embodiment of the disclosure.

FIG. 9 shows a top view and a cross-sectional view of the antenna device 900 according to an embodiment of the disclosure. The antenna device 900 may include a transparent substrate 910, an antenna 920, a ground layer 930, a dielectric layer 940, and a dielectric layer 960. In an embodiment, the antenna device 700 may further include a dielectric layer 950. The antenna device 900 may be similar to the antenna device 800.

The transparent substrate 910 may include a surface 911 and a surface 912 opposite to the surface 911. The dielectric layer 940 may include a surface 941 and a surface 942 opposite to the surface 941. The dielectric layer 940 may be in contact with the surface 911 via the surface 942 to be disposed at a side of the transparent substrate 910. The dielectric layer 950 may include a surface 951 and a surface 952 opposite to the surface 951. The dielectric layer 950 may be in contact with the surface 912 via the surface 951 to be disposed at a side of the transparent substrate 910. The dielectric layer 960 may include a surface 961 and a surface 962 opposite to the surface 961. The permittivity of the dielectric layer 940, 950, or 960 may be less than the permittivity of the transparent substrate 910.

The ground layer 930 may include a surface 931 and a surface 932 opposite to the surface 931. The ground layer 930 may be in contact with the surface 952 of the dielectric layer 950 via the surface 931 to be disposed at a side of the dielectric layer 950. The dielectric layer 960 may be in contact with the surface 932 of the ground layer 930 via the surface 961 to be disposed at a side of the ground layer 930. The ground layer 930 may be used as a reflection layer of the radiation part 921 and may assist the signal transmission of the feeding part 922.

The antenna 920 is, for example, a printed circuit that may be configured to radiate a wireless signal or receive a wireless signal, or a patterned circuit produced via a semiconductor process (e.g., lithography process). The antenna 920 may include a radiation part 921 and a feeding part 922. In an embodiment, the antenna 920 may further include a ground layer 930. The radiation part 921 may be disposed on the surface 941 of the dielectric layer 940. The feeding part 922 may be disposed in the dielectric layer 940 and in contact with the surface 911 of the transparent substrate 910.

The feeding part 922 may be electrically connected to the radiation part 921 through a via 970. The feeding part 922 is configured to receive an electrical signal and transmit the electrical signal to the radiation part 921. The shape of the radiation part 921 may be any shape such as rectangle, circle, or triangle. The radiation part 921 may further include a slot of any shape. For example, the radiation part 921 may be a rectangular structure including a slot 99 (not shown in the cross-sectional view of FIG. 9). The slot 99 may, for example, include a part 991 and a part 992 extended along the X direction, and may include a part 993 extended along the Y direction. In other words, the part 993 may be substantially perpendicular to the part 991 and the part 992. An end point of the part 991 may be connected to an end point of the part 992 via the part 993. The long sides of the rectangular structure may be extended along the Y direction, and the short sides of the rectangular structure may be extended along the X direction. A part of the feeding part 922 may produce a projection overlap on the radiation part 921, wherein the projection may be not overlapped with the slot 99.

An opening located at an end of the via 970 may be connected to the radiation part 921, and an opening located at another end of the via 970 may be connected to the feeding part 922. The via diameter of the via 970 may be, for example, less than or equal to 5 microns. The ratio (i.e.: aspect ratio) of the via diameter to the length of the via 970 is greater than or equal to 0.5 and less than or equal to 5. The taper angle of the via 970 may be greater than or equal to 40 degrees and less than or equal to 85 degrees.

The ground layer 930 may include a slot 933 and may be disposed between the dielectric layer 950 and the dielectric layer 960. The feeding part 922 is not in contact with the ground layer 930, and the via 980 may be extended from the feeding part 922 to the dielectric layer 960 via the slot 933.

The opening at one end of the via 980 may be connected to the feeding part 922, and the opening located at another end of the via 980 may be disposed on the surface 962 of the dielectric layer 960. A bonding pad (not shown) may be disposed at the opening surface of the via 980. The via diameter of the via 980 may be less than or equal to 5 microns. The ratio (i.e.: aspect ratio) of the via diameter to the length of the via 980 is greater than or equal to 0.5 and less than or equal to 5. The taper angle of the via 980 may be greater than or equal to 40 degrees and less than or equal to 85 degrees.

Figure 10:
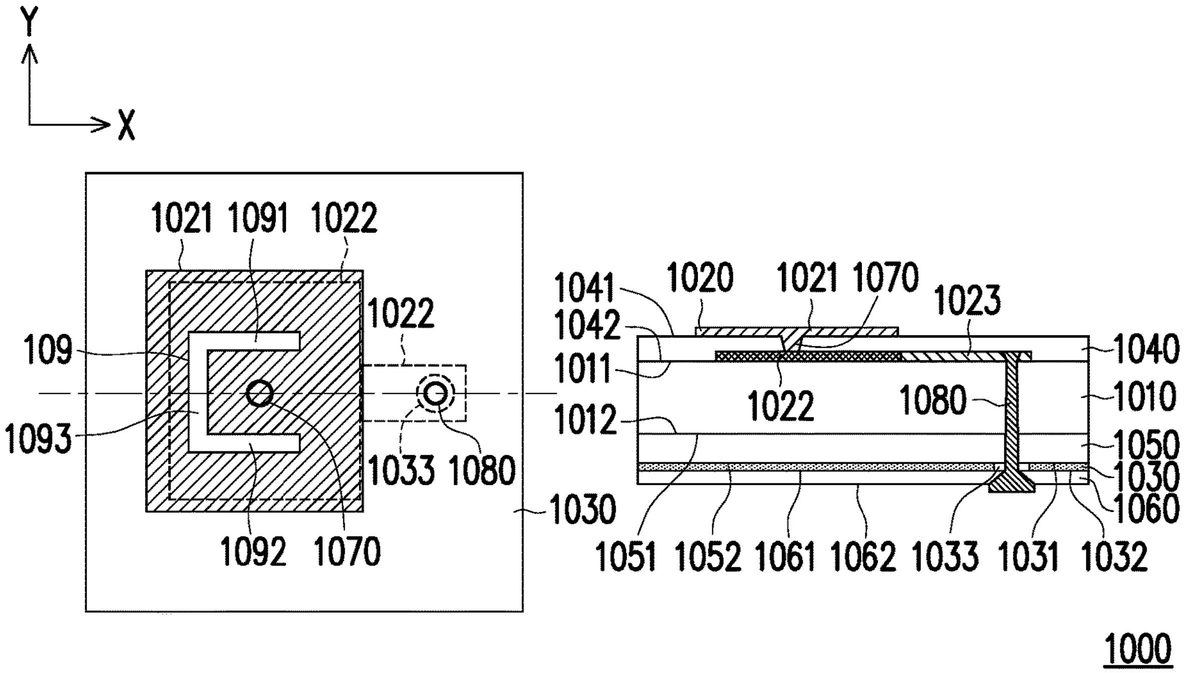
FIG. 10 shows a top view and a cross-sectional view of an antenna device 1000 according to an embodiment of the disclosure.

FIG. 10 shows a top view and a cross-sectional view of the antenna device 1000 according to an embodiment of the disclosure. The antenna device 1000 may include a transparent substrate 1010, an antenna 1020, a ground layer 1030, and a dielectric layer 1060. In an embodiment, the antenna device 1000 may further include a dielectric layer 1040 and/or a dielectric layer 1050. The antenna device 1000 may be similar to the antenna device 900.

The transparent substrate 1010 may include a surface 1011 and a surface 1012 opposite to the surface 1011. The dielectric layer 1040 may include a surface 1041 and a surface 1042 opposite to the surface 1041. The dielectric layer 1040 may be in contact with the surface 1011 via the surface 1042 to be disposed at a side of the transparent substrate 1010. The dielectric layer 1050 may include a surface 1051 and a surface 1052 opposite to the surface 1051. The dielectric layer 1050 may be in contact with the surface 1012 via the surface 1051 to be disposed at a side of the transparent substrate 1010. The dielectric layer 1060 may include a surface 1061 and a surface 1062 opposite to the surface 1061. The permittivity of the dielectric layer 1040, 1050, or 1060 may be less than the permittivity of the transparent substrate 1010.

The antenna 1020 is, for example, a printed circuit that may be configured to radiate a wireless signal or receive a wireless signal, or a patterned circuit produced via a semiconductor process (e.g., lithography process). The antenna 1020 may include a radiation part and a feeding part 1023, wherein the radiation part may include a radiation unit 1021 and a radiation unit 1022. In an embodiment, the antenna 1020 may further include a ground layer 1030. The area of the radiation unit 1021 and the area of the radiation unit 1022 may be the same or different. The radiation unit 1021 may be disposed on the surface 1041 of the dielectric layer 1040. The radiation unit 1022 may be disposed in the dielectric layer 1040 and in contact with the surface 1011 of the transparent substrate 1010. The feeding part 1023 may be disposed in the dielectric layer 1040 and in contact with the surface 1011 of the transparent substrate 1010.

The radiation unit 1021 may be electrically connected to the radiation unit 1022 through a via 1070. The feeding part 1023 and the radiation unit 1022 may be in direct contact and electrically connected. The feeding part 1023 is configured to receive an electrical signal and transmit the electrical signal to the radiation unit 1022. The shape of the radiation unit 1021 (or the radiation unit 1022) may be any shape such as rectangle, circle, or triangle. The radiation unit 1021 may further include a slot of any shape. For example, the radiation part 1021 may be a rectangular structure including a slot 109 (not shown in the cross-sectional view of FIG. 10). The slot 109 may, for example, include a part 1091 and a part 1092 extended along the X direction, and may include a part 1093 extended along the Y direction. The part 1093 may be substantially perpendicular to the part 1091 and the part 1092. An end point of the part 1091 may be connected to an end point of the part 1092 via the part 1093. The long sides of the rectangular structure may be extended along the Y direction, and the short sides of the rectangular structure may be extended along the X direction.

An opening located at an end of the via 1070 may be connected to the radiation unit 1021, and an opening located at another end of the via 1070 may be connected to the radiation unit 1022. The via diameter of the via 1070 may be less than or equal to 10 microns. The ratio (i.e.: aspect ratio) of the via diameter to the length of the via 1070 is greater than or equal to 0.5 and less than or equal to 5. The taper angle of the via 1070 may be greater than or equal to 40 degrees and less than or equal to 85 degrees.

The ground layer 1030 may include a surface 1031 and a surface 1032 opposite to the surface 1031. The ground layer 1030 may be in contact with the surface 1052 of the dielectric layer 1050 via the surface 1031 to be disposed at a side of the dielectric layer 1050. The dielectric layer 1060 may be in contact with the surface 1032 of the ground layer 1030 via the surface 1061 to be disposed at a side of the ground layer 1030. The ground layer 1030 may be used as a reflection layer for the radiation unit 1021 and the radiation unit 1022, and may assist the signal transmission of the feeding part 1023.

The ground layer 1030 may further include a slot 1033 and may be disposed between the dielectric layer 1050 and the dielectric layer 1060. The feeding part 1023 is not in contact with the ground layer 1030, and the via 1080 may be extended from the feeding part 1023 to the dielectric layer 1060 via the slot 1033.

The opening at one end of the via 1080 may be connected to the feeding part 1023, and the opening located at another end of the via 1080 may be disposed on the surface 1062 of the dielectric layer 1060. A bonding pad (not shown) may be disposed at the opening surface of the via 1080. The via diameter of the via 1080 may be less than or equal to 5 microns. The ratio (i.e.: aspect ratio) of the via diameter to the length of the via 1080 is greater than or equal to 0.5 and less than or equal to 5. The taper angle of the via 1080 may be greater than or equal to 40 degrees and less than or equal to 85 degrees.

Figure 11:
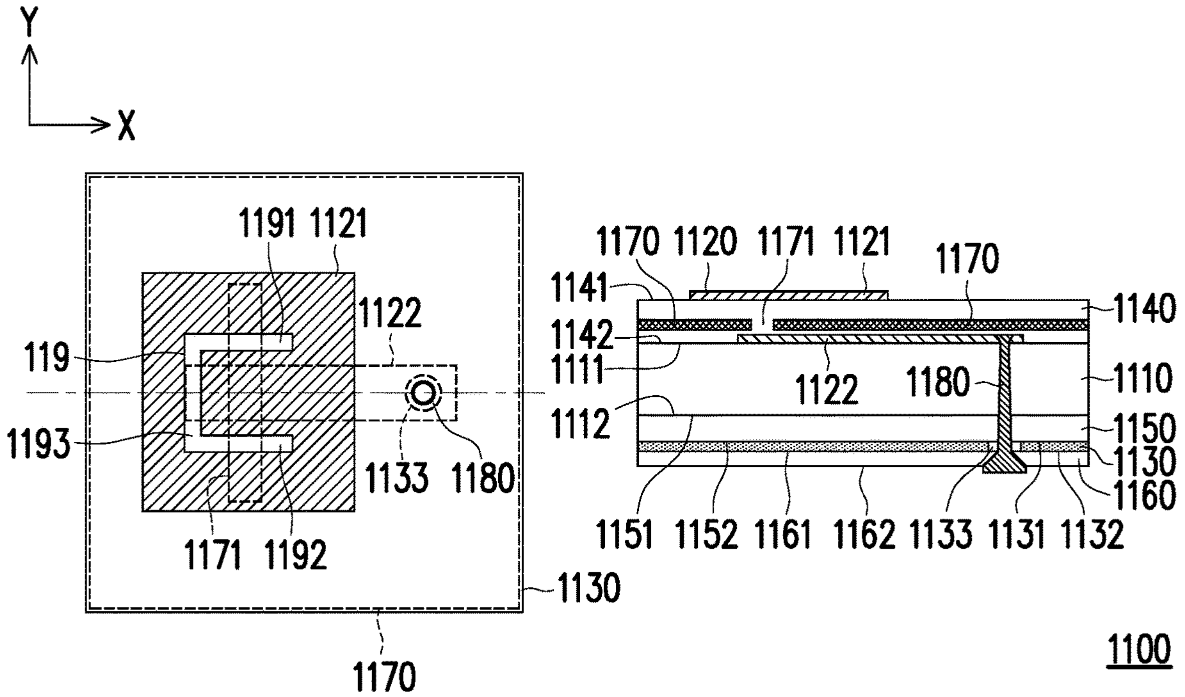
FIG. 11 shows a top view and a cross-sectional view of an antenna device 1100 according to an embodiment of the disclosure.

FIG. 11 shows a top view and a cross-sectional view of the antenna device 1100 according to an embodiment of the disclosure. The antenna device 1100 may include a transparent substrate 1110, an antenna 1120, a ground layer 1130, a dielectric layer 1160, a dielectric layer 1170, and a ground layer 1170. In an embodiment, the antenna device 1100 may further include a dielectric layer 1150. The antenna device 1100 may be similar to the antenna device 600.

The transparent substrate 1110 may include a surface 1111 and a surface 1112 opposite to the surface 1111. The dielectric layer 1140 may include a surface 1141 and a surface 1142 opposite to the surface 1141. The dielectric layer 1140 may be in contact with the surface 1111 via the surface 1142 to be disposed at a side of the transparent substrate 1110. The dielectric layer 1150 may include a surface 1151 and a surface 1152 opposite to the surface 1151. The dielectric layer 1150 may be in contact with the surface 1112 via the surface 1151 to be disposed at a side of the transparent substrate 1110. The dielectric layer 1160 may include a surface 1161 and a surface 1162 opposite to the surface 1161. The permittivity of the dielectric layer 1140, 1150, and 1160 may be less than the permittivity of the transparent substrate 1110.

The antenna 1120 is, for example, a printed circuit that may be configured to radiate a wireless signal or receive a wireless signal, or a patterned circuit produced via a semiconductor process (e.g., lithography process). The antenna 1120 may include a radiation part 1121 and a feeding part 1122. In an embodiment, the antenna 1120 may further include a ground layer 1130. The radiation part 1121 may be disposed on the surface 1141 of the dielectric layer 1140. The feeding part 1122 may be disposed in the dielectric layer 1140 and in contact with the surface 1111 of the transparent substrate 1110.

The radiation part 1121 may be vertically capacitively coupled with the feeding part 1122. The feeding part 1122 is configured to receive an electric signal and transmit the electric signal to the radiation part 1121. The shape of the radiation part 1121 may be any shape such as rectangle, circle, or triangle. The radiation part 1121 may further include a slot of any shape. For example, the radiation part 1121 may be a rectangular structure including a slot 119 (not shown in the cross-sectional view of FIG. 11). The slot 119 may, for example, include a part 1191 and a part 1192 extended along the X direction, and may include a part 1193 extended along the Y direction. The part 1193 may be substantially perpendicular to the part 1191 and the part 1192. An end point of the part 1191 may be connected to an end point of the part 1192 via the part 1193. The long sides of the rectangular structure may be extended along the Y direction, and the short sides of the rectangular structure may be extended along the X direction.

The ground layer 1170 is included in the dielectric layer 1140. The ground layer 1170 may include a slot 1171 and may be disposed between the radiation part 1121 and the feeding part 1122. The projection of the slot 1171 and the projection of a part of the radiation part 1121 may be overlapped on the feeding part 1122. Accordingly, the radiation part 1121 and the feeding part 1122 may be vertically capacitively coupled to each other.

The ground layer 1130 may include a surface 1131 and a surface 1132 opposite to the surface 1131. The ground layer 1130 may be in contact with the surface 1152 of the dielectric layer 1150 via the surface 1131 to be disposed at a side of the dielectric layer 1150. The dielectric layer 1160 may be in contact with the surface 1132 of the ground layer 1130 via the surface 1161 to be disposed at a side of the ground layer 1130. The ground layer 1130 may be used as a reflection layer of the radiation part 1121 and may assist the signal transmission of the feeding part 1122.

The ground layer 1130 may include a slot 1133 and may be disposed between the dielectric layer 1150 and the dielectric layer 1160. The feeding part 1122 may be not in contact with the ground layer 1130, and the via 1180 may be extended from the feeding part 1122 to the dielectric layer 1160 via the slot 1133.

The opening at one end of the via 1180 may be connected to the feeding part 1122, and the opening located at another end of the via 1080 may be disposed on the surface 1162 of the dielectric layer 1160. A bonding pad (not shown) may be disposed at the opening surface of the via 1180. The via diameter of the via 1180 may be less than or equal to 5 microns. The ratio (i.e.: aspect ratio) of the via diameter to the length of the via 1180 is greater than or equal to 0.5 and less than or equal to 5. The taper angle of the via 1180 may be greater than or equal to 40 degrees and less than or equal to 85 degrees.

Figure 12A:
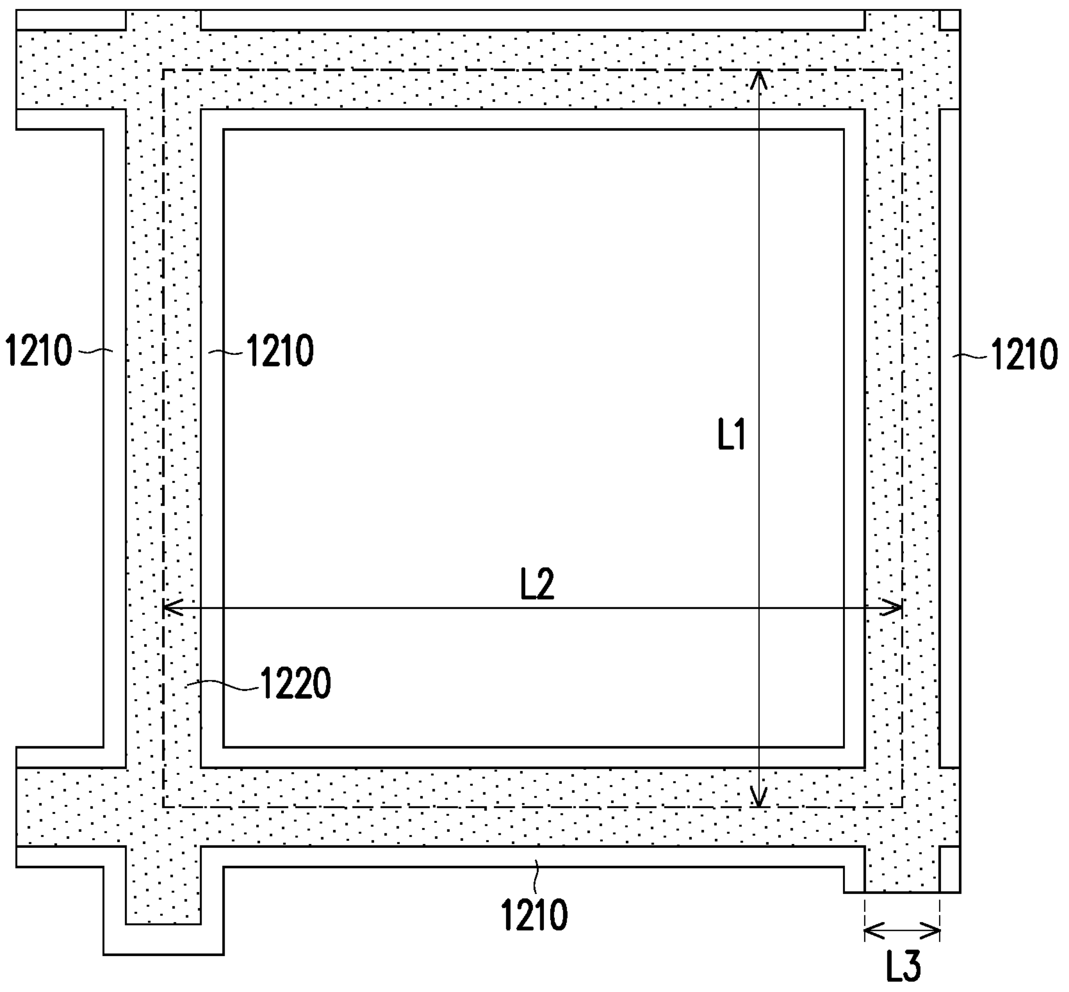
FIG. 12A shows a top view of mesh wires according to an embodiment of the disclosure.
Figure 12B:
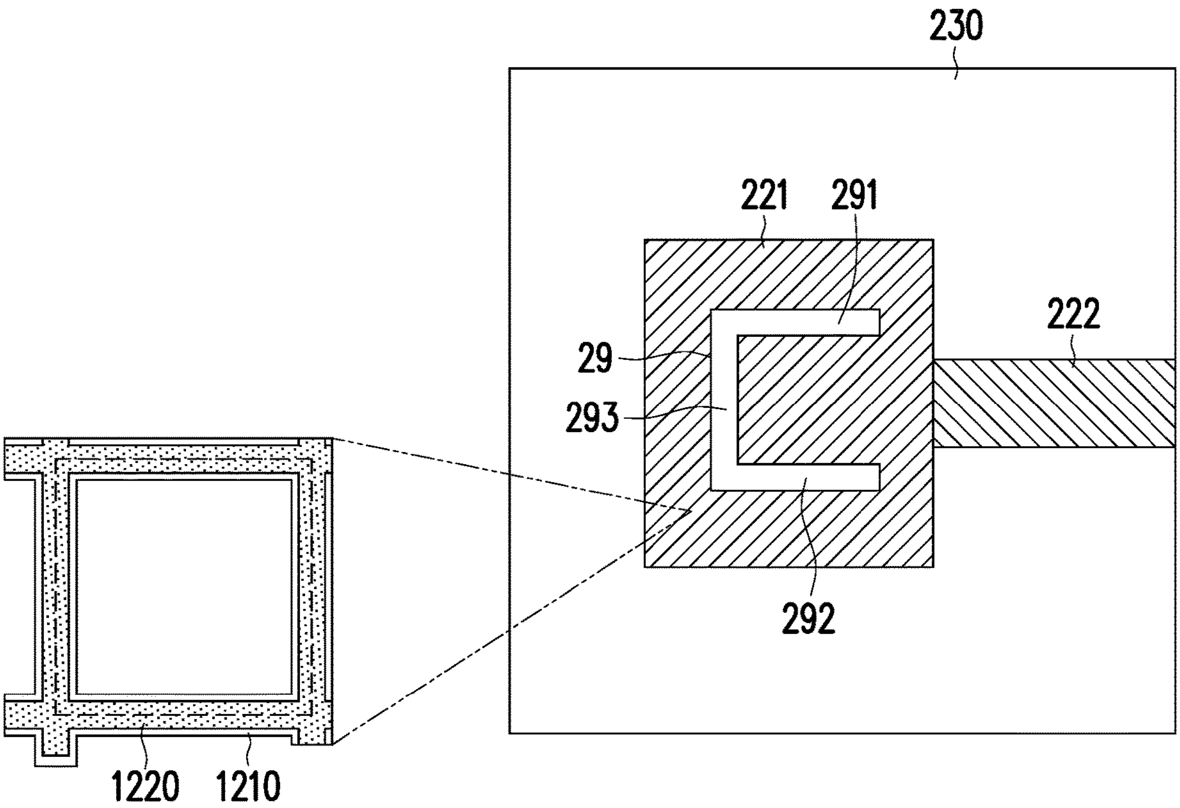
FIG. 12B shows a schematic diagram of a radiation part 221 formed by mesh wires according to an embodiment of the disclosure.

In order to increase the light transmittance of the antenna device, in an embodiment, each member of the antenna device (e.g., the radiation part, the feeding part, the ground layer, and/or the dielectric layer) may be formed by a plurality of mesh wires. FIG. 12A shows a top view of some mesh wires according to an embodiment of the disclosure. It is assumed that a mesh wire 1210 and a mesh wire 1220 belong to the first layer and the second layer of the antenna device respectively. Mesh wires of different layers may be aligned to improve the light transmittance of the overall structure of the antenna device. In other words, the orthographic projections of the mesh wire 1210 and the mesh wire 1220 may be overlapped partially or completely. Taking the radiation part 221 and the ground layer 230 as an example, the radiation part 221 may be formed by a plurality of mesh wires 1220 and the ground layer 230 may be formed by a plurality of mesh wires 1210, as shown in FIG. 12B.

The material of the mesh wires may include metal or any oxide conductive material. The ratio of the linewidth to the thickness of the mesh wires (i.e.: aspect ratio) may be greater than or equal to 0.5 and less than or equal to 5. The high aspect ratio structure makes the mesh wires have a higher aperture ratio, which may improve the light transmittance of the antenna device and effectively reduce the impedance of the mesh wires. In an embodiment, the mesh wires are formed by, for example, a sputtering process (e.g., copper sputtering) or an electroplating process (e.g., copper electroplating). The shape of the mesh may be any shape. Taking the rectangular mesh wires 1220 as an example, the aperture ratio of the mesh wires 1220 may be calculated according to the following equation (1), wherein OR is the aperture ratio, A is the area size of the mesh wires 1220 (A=L1*L2, wherein L1 is the length of the mesh wires 1220, and L2 is the width of the mesh wires 1220), and L3 is the linewidth of the mesh wires 1220.

$$OR = \frac{(L1 - L3) * (L2 - L3)}{A} \tag{1}$$

Figure 13:
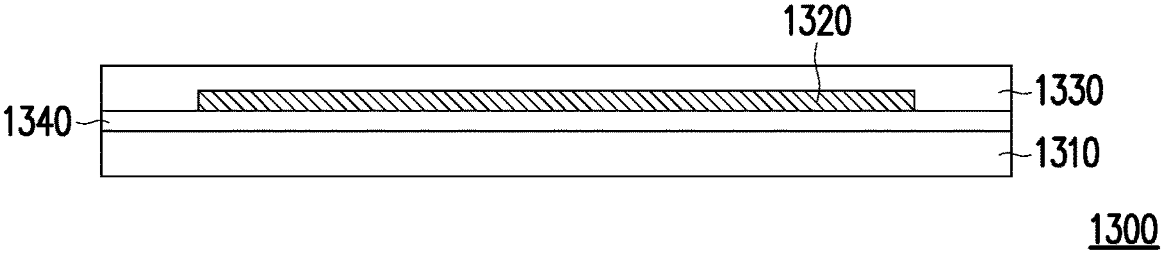
FIG. 13 shows a cross-sectional view of an antenna device 1300 having an anti-reflection layer 1330 according to an embodiment of the disclosure.
Figure 14:
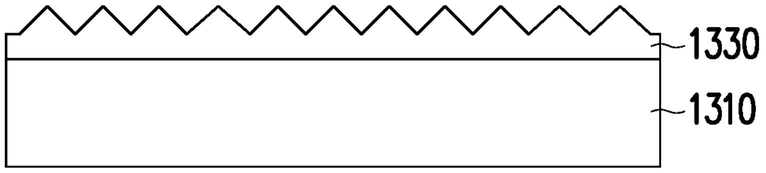
FIG. 14 shows a schematic diagram of an anti-reflection layer having a porous structure according to an embodiment of the disclosure.

In an embodiment, the antenna device may be covered by an anti-reflection layer. FIG. 13 shows a cross-sectional view of an antenna device 1300 having an anti-reflection layer 1330 according to an embodiment of the disclosure. The antenna device 1300 may include a transparent substrate 1310, an antenna 1320, an anti-reflection layer 1330, and a dielectric layer 1340, wherein the dielectric layer 1340 may be disposed on any surface of the transparent substrate 1310, and the antenna 1320 may be disposed on the surface of the dielectric layer 1340. The anti-reflection layer 1330 may cover the transparent substrate 1310, the antenna 1320, and the dielectric layer 1340 of the antenna device 1300. The refractive index of the anti-reflection layer 1330 may be greater than the refractive index of the air medium and less than the refractive index of the transparent substrate 1310. The anti-reflection layer 1330 is formed by, for example, a nanostructure such as a porous structure or a moth's eye structure (as shown in FIG. 14).

Table 1 shows performance comparison data of a plurality of antenna devices, wherein antenna device A is the antenna device 100 having the transparent substrate 110 with a permittivity of 5.6, antenna device B is the antenna device 200 having the transparent substrate 210 with a permittivity of 5.6 and the dielectric layer 240 with a permittivity of 3.2, and antenna device C is the antenna device 200 having the transparent substrate 210 with a permittivity of 5.6 and the dielectric layer 240 with a permittivity of 2.5. In the fields of Table 1, permittivity 1 represents the permittivity of the transparent substrate or the equivalent permittivity of the transparent substrate and the dielectric layer, and permittivity 2 represents the permittivity of the dielectric layer. It may be seen from Table 1 that compared with antenna device A, the antenna efficiency of antenna device B is increased by about 9.6%. Compared with antenna device A, the antenna efficiency of antenna device C is increased by about 22%.

TABLE 1

| Antenna | Permittivity 1 | Permittivity 2 | Bandwidth (GHz) | Gain (dBi) | Directivity (dBi) | Antenna efficiency |
|---|---|---|---|---|---|---|
| A | 5.6 | N/A | 61.1 to 62.87 | 4.8 | 6.2 | 72.4% |
| B | 5.1 | 3.2 | 60.23 to 63.3 | 4.9 | 5.9 | 79.4% |
| C | 4.8 | 2.5 | 57.69 to 60.36 | 5.1 | 5.3 | 95.5% |

Figure 15:
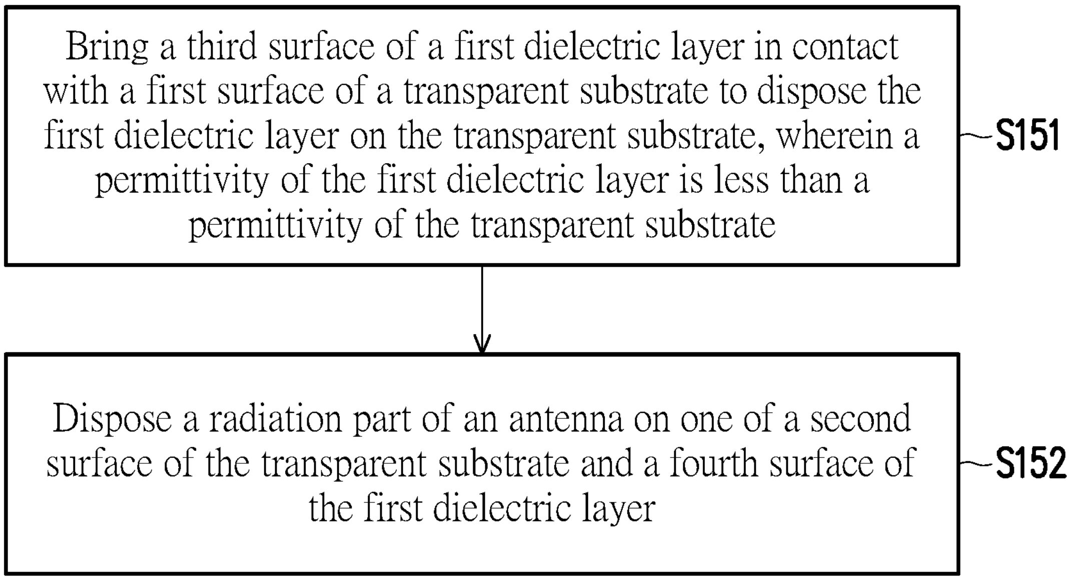
FIG. 15 shows a flowchart of a method of configuring an antenna device according to an embodiment of the disclosure.

FIG. 15 shows a flowchart of a method of configuring an antenna device of an embodiment of the disclosure, wherein the antenna device includes a transparent substrate having a first surface and a second surface opposite to the first surface, a first dielectric layer having a third surface and a fourth surface opposite to the third surface, and an antenna having a radiation part. In step S151, the third surface of the first dielectric layer is brought in contact with the first surface of the transparent substrate to dispose the first dielectric layer on the transparent substrate, wherein the permittivity of the first dielectric layer is less than the permittivity of the transparent substrate. In step S152, the radiation part of the antenna is disposed on one of the second surface of the transparent substrate and the fourth surface of the first dielectric layer.

In the embodiments of the disclosure, the dielectric layer having the lower permittivity may be disposed on the surface of the transparent substrate of the antenna device. The wires of the antenna may be disposed on the dielectric layer, and the linewidth of the metal wires may be related to the thickness of the dielectric layer. The embodiments of the disclosure have a high aspect ratio structure to reduce the overall impedance of the antenna device and increase the transmission gain of the wireless signal. In addition, the embodiments of the disclosure are not limited by the material properties of the transparent substrate, and may be applied to existing antenna device production lines.

What is claimed is:

1. An antenna device based on a transparent substrate, comprising:

a transparent substrate comprising a first surface and a second surface opposite to the first surface;

a first dielectric layer comprising a third surface and a fourth surface opposite to the third surface, wherein the first dielectric layer is in contact with the first surface via the third surface to be disposed on the transparent substrate, wherein a permittivity of the first dielectric layer is less than a permittivity of the transparent substrate;

an antenna comprising a radiation part, wherein the radiation part is disposed on one of the second surface and the fourth surface; and an anti-reflection layer covering the transparent substrate, the first dielectric layer, and the antenna, wherein a first refractive index of the anti-reflection layer is less than a second refractive index of the transparent substrate.

2. The antenna device of claim 1, further comprising:

a second dielectric layer in contact with the second surface to be disposed on the transparent substrate, wherein a permittivity of the second dielectric layer is less than the permittivity of the transparent substrate.

3. The antenna device of claim 2, further comprising:

a first ground layer comprising a fifth surface, wherein the first ground layer is in contact with the second dielectric layer via the fifth surface to be disposed on the second dielectric layer.

4. The antenna device of claim 3, wherein the radiation part is disposed on the fourth surface, wherein the antenna device further comprises:

a third dielectric layer comprising a sixth surface and a seventh surface opposite to the sixth surface, wherein the third dielectric layer is in contact with the first ground layer via the sixth surface to be disposed on the first ground layer, wherein a feeding part of the antenna is disposed on the seventh surface.

5. The antenna device of claim 4, wherein the first ground layer comprises a slot, wherein the slot is overlapped with a part of a projection of the radiation part on the feeding part.

6. The antenna device of claim 3, wherein the radiation part is disposed on the fourth surface, wherein the antenna further comprises:

a feeding part disposed on the fourth surface and electrically connected to the radiation part.

7. The antenna device of claim 6, further comprising:

a third dielectric layer disposed on the first ground layer, wherein the feeding part is electrically connected to the third dielectric layer through a via.

8. The antenna device of claim 7, wherein the first ground layer comprises a slot, wherein the via is extended from the feeding part to the third dielectric layer via the slot.

9. The antenna device of claim 1, wherein the radiation part is disposed on the fourth surface, wherein the antenna further comprises:

a feeding part disposed in the first dielectric layer and in contact with the transparent substrate, wherein the feeding part is electrically connected to the radiation part through a via.

10. The antenna device of claim 1, wherein the radiation part comprises a first radiation unit disposed at the fourth surface and a second radiation unit disposed in the first dielectric layer and in contact with the transparent substrate, wherein the first radiation unit is electrically connected to the second radiation unit through a via, wherein the antenna further comprises:

a feeding part disposed in the first dielectric layer and in contact with the transparent substrate, wherein the feeding part is electrically connected to the second radiation unit.

11. The antenna device of claim 1, wherein the radiation part is disposed on the fourth surface, wherein the antenna device further comprises:

a second ground layer comprising a slot and disposed between the radiation part and a feeding part of the antenna, wherein the feeding part is disposed in the first dielectric layer and in contact with the transparent substrate, wherein the slot is overlapped with a part of a projection of the radiation part on the feeding part.

12. The antenna device of claim 1, wherein the radiation part comprises a slot.

13. The antenna device of claim 1, wherein the antenna comprises a mesh wire.

14. The antenna device of claim 13, wherein a ratio of a linewidth to a thickness of the mesh wire is greater than or equal to 0.5 and less than or equal to 5.

15. The antenna device of claim 1, further comprising:

a via, wherein a taper angle of the via is greater than or equal to 40 degrees and less than or equal to 85 degrees.

16. The antenna device of claim 1, further comprising:

a via, wherein a ratio of a via diameter to a length of the via is greater than or equal to 0.5 and less than or equal to 5.

17. The antenna device of claim 1, wherein the permittivity of the first dielectric layer is greater than or equal to 2 and less than or equal to 4.

18. The antenna device of claim 1, wherein the anti-reflection layer comprises a porous structure or a moth-eye structure.

19. A method of configuring an antenna device based on a transparent substrate, wherein the antenna device comprises a transparent substrate having a first surface and a second surface opposite to the first surface, a first dielectric layer having a third surface and a fourth surface opposite to the third surface, and an antenna having a radiation part, wherein the method comprises:

bringing the third surface of the first dielectric layer in contact with the first surface of the transparent substrate to dispose the first dielectric layer on the transparent substrate, wherein a permittivity of the first dielectric layer is less than a permittivity of the transparent substrate;

disposing the radiation part of the antenna on one of the second surface of the transparent substrate and the fourth surface of the first dielectric layer; and covering the transparent substrate, the first dielectric layer, and the antenna by an anti-reflection layer, wherein a first refractive index of the anti-reflection layer is less than a second refractive index of the transparent substrate.

* * * * *